Oct. 3, 1967  C. F. PRISER  3,344,652
CALIBRATION MEANS FOR AN OMNI INSTRUMENT
Filed June 21, 1965  2 Sheets-Sheet 1

INVENTOR.
CLOVIS F. PRISER
BY
ATTORNEYS

Oct. 3, 1967   C. F. PRISER   3,344,652
CALIBRATION MEANS FOR AN OMNI INSTRUMENT
Filed June 21, 1965   2 Sheets-Sheet 2

INVENTOR.
CLOVIS F. PRISER
BY
ATTORNEYS

United States Patent Office 3,344,652
Patented Oct. 3, 1967

3,344,652
CALIBRATION MEANS FOR AN OMNI
INSTRUMENT
Clovis F. Priser, 6444 Santa Aurelia,
Tucson, Ariz. 85715
Filed June 21, 1965, Ser. No. 465,694
15 Claims. (Cl. 73—1)

ABSTRACT OF THE DISCLOSURE

A calibration adjustment for an omni instrument which can be made externally of the housing of the instrument. The drive train from the resolver of the instrument to the indicating dial includes two concentric shafts extending through the front of the instrument. One shaft is connected to the resolver and the other is connected to the dial. Normally a knob is locked to both shafts so that the resolver and shaft can be simultaneously moved. Provision is made for disconnecting one of the shafts from the knob so that the angular relationship between the dial and resolver may be changed.

---

This invention relates to an omni instrument and more particularly to an omni instrument having means to enable calibration thereof without removing the instrument from a panel of a vehicle, such as an aircraft, in which it is mounted.

Aircraft qualified for I.F.R. (instrument flight rules) flights must have their instrumentation checked periodically for accuracy. An omni instrument of the aircraft must have an accuracy of ±4° to be properly qualified and certified. In the event that the instrument is out of calibration and the inaccuracy exceeds 4°, the instrument must be removed from the instrument panel of the aircraft and bench calibrated at some remote location. Removing and replacing the instrument is time consuming and helps render the overall calibration operation lengthy and expensive; the downtime of the aircraft also is increased. In some instances, when the instruments have been removed, pressure lines, wiring, and cables have been in the way and have had to be disconnected and reinstalled in order to remove and replace the instrument. Further, the bench test equipment has not always corresponded to the aircraft receiver equipment with the result that the omni instrument is inacurate when reinstalled in the aircraft. The inaccuracy results whether the error is in the test equipment or in the aircraft receiver equipment.

The present invention relates to an omni instrument which can be calibrated and corrected without being removed from the instrument panel of the aircraft. Consequently, the matter of calibration requires a much shorter period of time and is much less expensive. Further, the instrument is calibrated with the receiving equipment of the aircraft so that there is no problem of inaccuracy resulting from a difference between the aircraft equipment and the bench test equipment.

It is, therefore, a principal object of the invention to provide an omni instrument which can be calibrated without being removed from its operating location.

Another object of the invention is to provide an omni instrument which can be calibrated without requiring special test equipment or the services of a specially qualified technician.

Many other objects and advantages of the invention will be apparent from the following detailed description of a preferred embodiment thereof, reference being made to the accompanying drawings, in which.

The omni instrument embodying the invention can be designed after a number of commercial instruments, including several models made by King and Dare. The instrument preferably employs a resolver to control the left-right needle indicator because a resolver has a constant phase angle through 360°. Consequently, the angle of error in any one position is the same for any other position, with a correction of the instrument for one position thereby equally applying to all positions.

The new omni instrument embodying the invention can be adjusted to correct fully any error therein without being removed from the instrument panel, without requiring any special test equipment, and without requiring a skilled technician to make the corrections. Heretofore, the instrument had to be removed from the panel and the instrument housing subsequently had to be dismantled to enable access to the interior. In some aircraft, certain lines, cables, etc. have had to be disconnected and subsequently reinstalled to enable removal and replacement of the instrument. The equipment then had to be transported to the test location wherein the instrument was calibrated by a skilled technician. The length of time required to perform the overall operation also resulted in longer downtime for the aircraft, especially if the technician was not readily available. Finally, the test equipment did not always correspond to the receiving equipment of the aircraft with the result that the instrument again was inaccurate when replaced in the aircraft.

With the instant invention, the omni instrument can be calibrated without being removed from the instrument panel, by an external adjustment which will cause the left-right needle to be vertical when the dial is turned to the proper bearing reading or vice versa. The correction can be made in several ways. At many airports, special test frequencies are available which should cause the omni instrument to read 0° on the bearing selector when the left-right needle is centered, regardless of the position of the aircraft. The omni instruments also can be tested by simply flying the aircraft over a test point with the omni instrument indicating a prescribed direction. In a third method, the pilot can park the aircraft at a specially designated point on the airport, which point is a predetermined direction from the point of origination of the VHF radio waves. The omni bearing should then read as specified.

Figure 1:
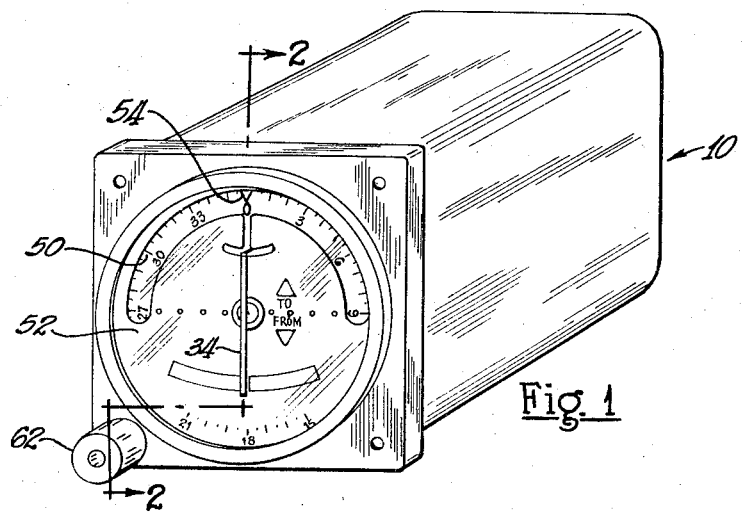
FIG. 1 is a front view in perspective of an omni instrument embodying the invention.
Figure 2:
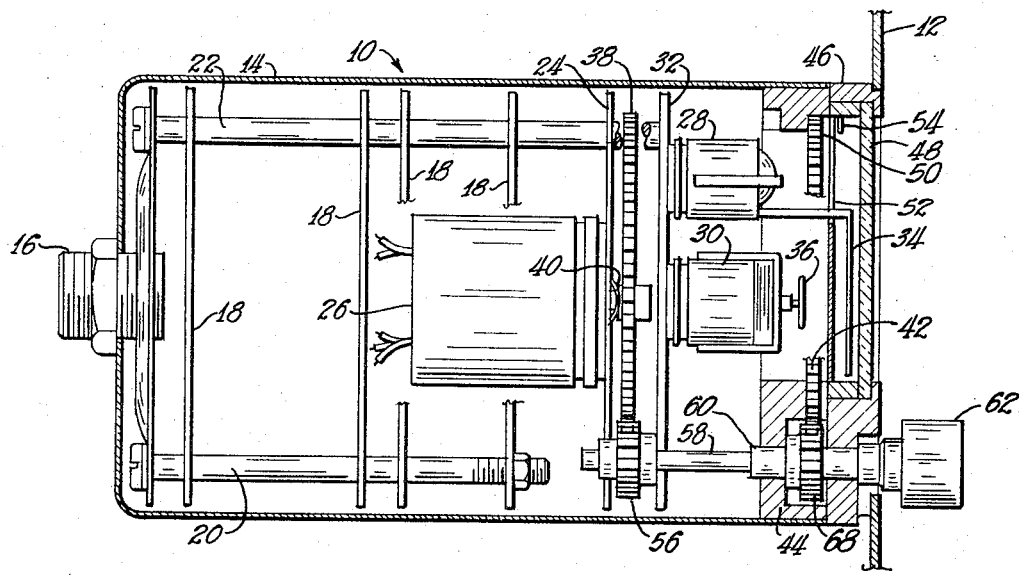
FIG. 2 is a somewhat schematic view in vertical, longitudinal cross section taken generally along the line 2—2 of FIG. 1.

Referring to the drawings, and more particularly to FIGS. 1 and 2, an omni instrument embodying the invention is indicated at 10 and is mounted in an instrument panel 12 of an aircraft or other vehicle, such as a boat, employing omni instruments. As shown, the instrument 10 includes a housing 14 having a rear electrical connection 16. Within the housing 14 are several printed circuit boards designated 18 held by connecting posts 20 and 22. In front of the printed circuit boards 18 is a mounting plate 24 upon which is centrally supported a resolver 26. A needle housing 28 and a flag housing 30 are both responsive to the resolver 26 and the associated circuitry, and are mounted on a meter plate 32. The needle housing 28, in turn, controls a left-right needle 34 of L-shape configuration and the housing 30 controls a to-from flag 36. A resolver gear 38 is mounted on a shaft 40 of the resolver 26 and a dial gear 42 is located in front of the housings 28 and 30 in a frame 44. A bezel or mounting ring 46 is affixed to the front of the frame 44 and holds a transparent or glass cover 48.

A dial 50 is attached to the face of the dial gear 42 and is marked in 360° indicia. A mask 52 is located behind the needle 34 and in front of the flag 36 and the dial 50 to mask off part of the direction indicia of the dial 50 and to provide openings through which the flag 36 can be seen to indicate whether the plane is proceeding toward or away from the originating point of the VHF radio waves. When the aircraft is at a direction from the originating point equal to the bearing on the dial 50 indicated by a pointer 54, then the left-right needle 34 is vertical and points to suitable indicia on the mask 52. The above components are known in the art and will not be discussed in detail.

Figure 3:
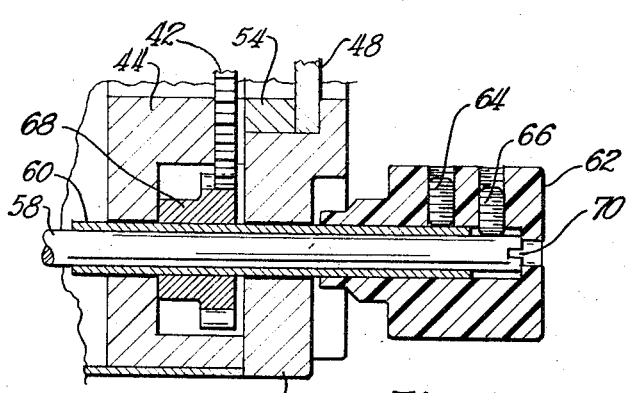
FIG. 3 is an enlarged view of part of a calibration mechanism for the omni instrument of FIGS. 1 and 2.

In accordance with the invention, a resolver drive gear 56 is mounted on a first shaft 58 which extends through the frame 44 and the bezel 46 beyond the transparent cover 48. A second shaft 60 is coaxial and, in this instance, concentric with, part of the first shaft 58 and also extends beyond the transparent cover 48, terminating just short of the first shaft 58 (FIG. 3). A knob 62 is mounted on the second shaft 60 and is affixed thereto by a setscrew 64. The knob 62 also has a second setscrew 66 by means of which it can be affixed to the outer end of the first shaft 58. A dial drive gear 68 is mounted on the shaft 60 to rotate the dial gear 42 and the dial 50 when the shaft 60 is turned. With both setscrews tightened, when the knob 62 is turned, the resolver gear 38 and the dial gear 50 will be rotated simultaneously. The rotation of the resolver gear 38 adjusts the resolver 26 to change the position of the needle 34 through the housing 28. At any time the needle 34 is vertical, the pilot knows immediately that the direction from the omni station is that indicated on the dial 50 by the pointer 54. On the other hand, the pilot can set a predetermined bearing on the dial 50 and will know that the plane is that direction from the omni station when the needle is vertical. In each case, the pilot knows whether he is heading toward or away from the specific station by the "TO" or "FROM" window at which the flag 36 appears.

For test purposes, when the bearing is known, in the event that the bearing indicated on the dial 50 by the pointer 54 is not the proper bearing when the needle 34 is straight, or in the event that the needle 34 is not vertical when the dial 50 is at the proper bearing indicated by the pointer 54, then the instrument requires calibration, particularly if inaccurate by more than 4°. With the calibrating mechanism shown, this can be accomplished simply by loosening the setscrew 66 and turning the first shaft 58 while holding the knob 62 and the second shaft 60 in a set position. To facilitate this, the end of the first shaft 58 has a transverse slot 70 therein to receive a small screwdriver. Once the needle 34 and the dial 50 are properly positioned, the setscrew 66 is again tightened and the calibrating operation is complete. By using the resolver 26, an error that is corrected at any given bearing for the instrument will similarly be corrected for all other directions through 360°. Of course, the calibration can also be effected by loosening the setscrew 66 and holding the first shaft 58 by means of the screwdriver while the second shaft 60 is rotated to change the dial setting by turning the knob 62. In either case, the relative rotation of the resolver gear 38 and the dial gear 42 enables the desired calibration to be achieved.

Figure 4:
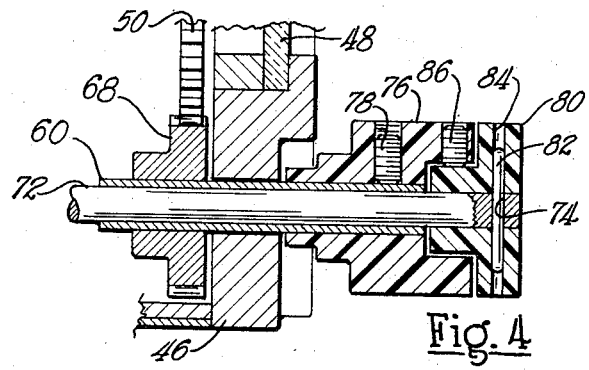
FIGS. 4–7 show slightly modified calibration mechanisms embodying the invention.

Other mechanisms can be used to achieve the desired calibration by the relative rotation of the two gears 38 and 42. Referring to FIG. 4, a slightly modified first shaft 72 has a transverse hole 74 near the end thereof but is otherwise similar to the first shaft 58. The second shaft 60 is affixed to a calibrating knob 76 by means of a setscrew 78 with the first shaft 72 being affixed to a second knob 80 through a pin 82 extending through a passage 84 in the knob 80 and through the hole 74 in the shaft 72. The two knobs 76 and 80 are connected by a second setscrew 86 which, when tightened, causes the two knobs to rotate together. In the event that calibration is required, the setscrew 86 is simply loosened and the two knobs 76 and 80 then rotated relative to one another to cause the shafts 72 and 60 to rotate relative to one another, thereby rotating the drive gears 56 and 68 and causing relative rotation of the resolver gear 38 and the dial gear 50. When the needle and the dial again are properly coordinated, the setscrew 86 is tightened to complete the calibration.

Figure 5:
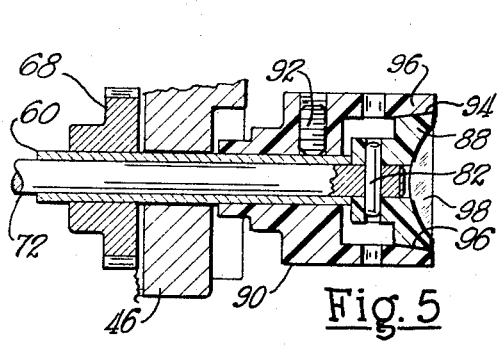

Referring to FIG. 5, a slightly modified calibrating mechanism is shown in the form of a modified knob 88 affixed to the first shaft 72 through the pin 82. A modified knob 90 is affixed to the second shaft 60 by a setscrew 92. A friction fit is achieved between the knobs 88 and 90 by tapered surfaces 94 and 96 respectively which assure that the two knobs 88 and 90 will rotate together. However, in the event that calibration or correction is desired, a screwdriver, coin, or the like, can be inserted in a slot 98 of the knob 88 with the knob 88 then rotated when the knob 90 is held, or vice versa. The desired degree of friction between the two knobs can be achieved by moving the knob 90 longitudinally of the shaft 60 to the desired position before tightening the setscrew 92.

Figure 6:
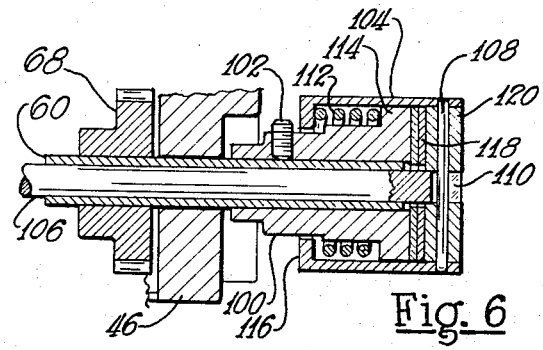

The calibrating mechanism of FIG. 6 includes an inner knob 100 affixed to the second shaft 60 by means of a setscrew 102. An outer knob 104 extends around the knob 100 and is connected to a first shaft 106 by a pin 108 extending through a slot 110 in the terminal end of the shaft 106. A spring 112 is located around a portion of the inner knob 100 between a shoulder 114 thereon and an end flange 116 of the outer knob 104. When the outer knob 104 is turned, it rotates the first shaft 106 through the pin 108 and also rotates the inner knob 100 and the shaft 60 through a pair of friction discs 118 which are pressed between the end of the shoulder 114 and an annular plate 120 held in the end of the knob 104 by the pin 108. When the knob 104 is pulled outwardly, the friction connection achieved between the two knobs by the discs 118 is broken so that the knob 104 then rotates only the shaft 106 through the pin 108 to enable the desired relative rotation between the resolver gear and the dial gear to be achieved once again.

Figure 7:
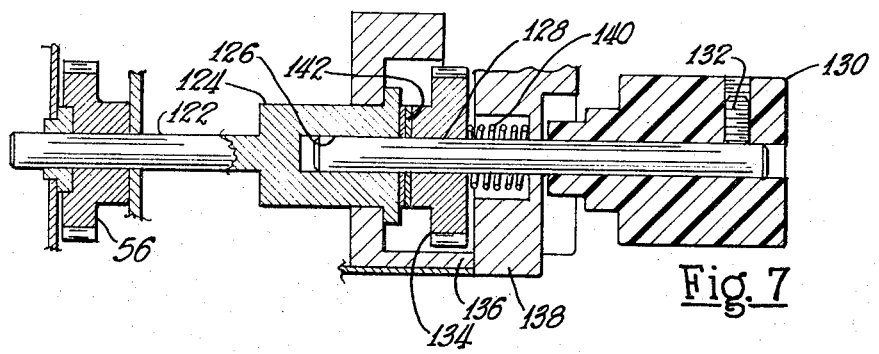

Referring to FIG. 7, another modified calibration mechanism includes a first shaft 122 having an enlarged end 124 with a recess 126. The inner end of a second shaft 128 is received in the recess 126 with the shaft having an outer knob 130 affixed thereto by a setscrew 132. A dial drive gear 134 is affixed to the second shaft 128 and is received in a modified frame 136 which has a large opening in which the enlarged head 124 of the shaft 122 is rotatably supported. A modified bezel 138 has a recess receiving a pressure spring 140. The spring 140 urges the second shaft 128 and the gear 134 toward the face of the enlarged end 124 of the shaft 122.

With this arrangement, a driving engagement is established between the shaft 122 and the shaft 128 through friction discs 142 located between the enlarged end 124 and the gear 134. This enables both the resolver gear and the dial gear to rotate when the knob 130 is turned. However, to enable relative rotation between the resolver and dial gears, the knob 130 is pulled outwardly slightly to eliminate the driving engagement between the two shafts. The dial gear can then be turned by means of the knob 130 without turning the resolver gear. The spring and the shafts can also be arranged so that the knob can be pushed to release the driving engagement between the two shafts.

Various modifications of the invention will be apparent to those skilled in the art, and it is to be understood that such modifications can be made without departing from the scope of the invention, if they are within the spirit and the tenor of the accompanying claims.

I claim:

1. An omni instrument comprising an enlongate housing closed at one end and having a transparent cover at the other end, circuit means and a resolver carried in said housing, a resolver gear attached to said resolver in said housing, said gear being located in a plane perpendicular to the longitudinal extent of said housing, a resolver drive gear in mesh with said resolver gear, a first shaft affixed to said resolver drive gear, a dial gear having a 360° dial on the periphery thereof and rotatably carried in said housing, a left-right needle, means in said housing carrying said needle, said carrying means being responsive to said resolver to move said needle to a central position when said instrument is in a predetermined position relative to a VHF station and said resolver gear and said dial gear are in predetermined positions relative to one another, a second shaft coaxial with said first shaft, a dial drive gear meshing with said dial gear and mounted on said second shaft, a knob affixed to one of said shafts externally of said housing for rotating one of said drive gears, and means selectively connecting said knob and the other of said shafts to enable relative rotation between said resolver gear and said dial gear.

2. An omni instrument comprising a housing, circuit means and a resolver carried in said housing, a resolver gear attached to said resolver in said housing, a resolver drive gear in mesh with said resolver gear, a first shaft affixed to said resolver drive gear, a dial gear having a dial thereon and rotatably carried in said housing, a left-right needle, means in said housing carrying said needle, said carrying means being responsive to said resolver to move said needle to a predetermined position when said instrument is in a predetermined position and said resolver gear and said dial gear are in predetermined positions relative to one another, a second shaft coaxial with said first shaft, a dial drive gear meshing with said dial gear and mounted on said second shaft, a knob affixed to one of said shafts in front of said housing for rotating one of said drive gears, and means selectively connecting said knob and the other of said shafts to enable relative rotation between said resolver gear and said dial gear.

3. An omni instrument comprising a housing, circuit means and a resolver carried in said housing, a resolver gear attached to said resolver in said housing, a resolver drive gear in mesh with said resolver gear, a first shaft affixed to said resolver drive gear and extending forwardly beyond said housing, a dial gear having a dial thereon and rotatably carried in said housing, a left-right needle, means in said housing carrying said needle, said carrying means being responsive to said resolver to move said needle to a predetermined position when said instrument is in a predetermined positon and said resolver gear and said dal gear are in predetermined positions relative to one another, a second shaft concentric with said first shaft, a dial drive gear in mesh with said dial gear and mounted on said second shaft, a knob affixed to said second shaft in front of said housing for rotating said dial gear, and means selectively connecting said knob and said first shaft to enable relative rotation between said resolver gear and said dial gear and to enable said resolver gear and said dial gear to rotate together.

4. An omni instrument according to claim 3 further characterized by means associated with said first shaft to enable rotation of said first shaft independently of said second shaft.

5. An omni instrument comprising a housing, circuit means and a resolver carried in said housing, a resolver gear attached to said resolver in said housing, a resolver drive gear in mesh with said resolver gear, a first shaft affixed to said resolver drive gear and extending beyond said housing, a dial gear having a dial thereon and rotatably carried in said housing, a left-right needle, means in said housing carrying said needle, said carrying means being responsive to said resolver to move said needle to a predetermined position when said instrument is in a predetermined position and said resolver gear and said dial gear are in predetermined positions relative to one another, a second shaft concentric with said first shaft and terminating short of the outer end of said first shaft, a dial drive gear in mesh with said dial gear and mounted on said second shaft, a knob affixed to said second shaft in front of said housing for rotating said dial gear, said knob having fastener means releasably engageable with said first shaft to enable relative rotation between said resolver gear and said dial gear and to enable said resolver gear and said dial gear to rotate together.

6. An omni instrument according to claim 5 wherein said fastener means constitutes a setscrew threadedly engaged with said knob and engageable with the outer end of said first shaft beyond said second shaft.

7. An omni instrument according to claim 5 wherein said first shaft has a slot in the outer end thereof to enable said first shaft to be turned when said fastener means is released and said knob is held.

8. An omni instrument comprising a housing, circuit means and a resolver carried in said housing, a resolver gear attached to said resolver in said housing, a resolver drive gear in mesh with said resolver gear, a first shaft affixed to said resolver drive gear and extending beyond said housing, a dial gear having a dial thereon and rotatably carried in said housing, a left-right needle, means in said housing carrying said needle, said carrying means being responsive to said resolver to move said needle to a predetermined position when said instrument is in a predetermined position and said resolver gear and said dial gear are in predetermined positions relative to one another, a second shaft concentric with said first shaft and terminating short of the outer end of said first shaft, a dial drive gear in mesh with said dial gear and mounted on said second shaft, a knob affixed to said second shaft in front of said housing for rotating said dial gear, a second knob affixed to said first shaft, and means selectively connecting said knobs to enable relative rotation between said resolver gear and said dial gear and to enable said resolver gear and said dial gear to rotate together.

9. An omni instrument according to claim 8 wherein said selectively connecting means constitutes a setscrew threadedly engaged in said first knob and engageable with said second knob.

10. An omni instrument according to claim 8 wherein said selectively connecting means constitutes tapered surfaces on said knobs frictionally engaged with one another when said knobs are moved toward one another.

11. An omni instrument according to claim 10 wherein said second knob has a slot extending transversely of said first shaft.

12. An omni instrument comprising a housing, a resolver in said housing, a resolver gear attached to said resolver in said housing, a resolver drive gear in mesh with said resolver gear, a first shaft affixed to said resolver gear and extending beyond said housing, a dial gear rotatably carried in said housing, a second shaft concentric with said first shaft and terminating short of the outer end of the first shaft, a dial drive gear in mesh with said dial gear and mounted on said second shaft, an inner knob affixed to said second shaft for rotating said dial gear, an outer knob, a pin carried by said outer knob at an outer end thereof, said first shaft having a terminal slot in which said pin can be received, spring means connected between said inner and outer knobs and urging said outer knob toward said housing to urge said pin into said slot, and friction disc means between said knobs to enable said inner knob and said second shaft to be turned when said outer knob is turned.

13. An omni instrument comprising a housing, a resolver in said housing, a resolver gear attached to said resolver in said housing, a resolver drive gear in mesh with said resolver gear, a first shaft affixed to said resolver gear, a dial gear rotatably carried in said housing, a second shaft coaxial with said first shaft and extending beyond said housing, a dial drive gear in mesh with said dial gear and mounted on said second shaft, a knob affixed to said second shaft for rotating said dial gear, said first shaft having an enlarged end with a recess received on the inner end of said second shaft, friction disc means between said dial drive gear and said enlarged end of said first shaft for enabling said first shaft to be rotated when said second shaft is rotated, and spring means urging said dial drive gear and said second shaft toward said enlarged end of said first shaft.

14. An omni instrument comprising a housing, a resolver in said housing, a resolver gear attached to said resolver in said housing, a resolver drive gear in mesh with said resolver gear, a first shaft affixed to said resolver gear and extending outside said housing, a dial gear having a dial thereon and rotatably carried in said housing, a second shaft concentric with said first shaft and extending outside said housing but terminating short of the outer end of the first shaft, a dial drive gear in mesh with said dial gear and mounted on said second shaft, a knob affixed to said second shaft for rotating said dial gear and means for selectively connecting said knob to the outer end of said first shaft.

15. An omni instrument comprising an elongate housing closed at one end and having a transparent cover at the other end, circuit means and a resolver carried in said housing, a resolver means attached to said resolver in said housing, resolver drive means continually engaged with said resolver means, dial means having a dial on the periphery thereof and rotatably carried in said housing, a left-right needle, means in said housing carrying said needle, said carrying means being responsive to said resolver to move said needle to a central position when said instrument is in a predetermined position relative to a VHF station and said resolver means and said dial means are in predetermined positions relative to one another, a first shaft rotatably supported by said housing and having an end extending outwardly beyond said other end thereof, dial drive means continually engaged with said dial means and mounted in a fixed position on said first shaft, a second shaft rotatably mounted within said housing, resolver drive means continually engaged with said resolver means and mounted in a fixed position on said second shaft, and means connectable with both of said shafts and including manually-operable knob means located externally of said other end of said housing selectively to cause said first and second shafts to rotate together and to rotate one relative to the other.

References Cited
UNITED STATES PATENTS 3,135,122  6/1964  Pierce _____ 116—124.1 X

OTHER REFERENCES

Bose Aviation Electronics Handbook, The Bobbs-Merrill Co., Inc., New York, 1962 (pages 79–80 relied upon).

LOUIS R. PRINCE, *Primary Examiner.*

S. C. SWISHER, *Assistant Examiner.*